United States Patent
Zhang et al.

(10) Patent No.: US 10,676,590 B2
(45) Date of Patent: Jun. 9, 2020

(54) RESIN COMPOSITION AND ARTICLE MADE THEREFROM

(71) Applicant: Elite Electronic Material (KunShan) Co., Ltd., Kunshan, Jiangsu Province (CN)

(72) Inventors: Yan Zhang, Kunshan (CN); Mingsheng Yuan, Kunshan (CN); Ningning Jia, Kunshan (CN); Rongtao Wang, Kunshan (CN)

(73) Assignee: ELITE ELECTRONIC MATERIAL (KUNSHAN) CO., LTD., Kunshan, Jiangsu Province (CN)

( * ) Notice: Subject to any disclaimer, the term of this patent is extended or adjusted under 35 U.S.C. 154(b) by 320 days.

(21) Appl. No.: 15/857,486

(22) Filed: Dec. 28, 2017

(65) Prior Publication Data

US 2019/0144632 A1 May 16, 2019

(30) Foreign Application Priority Data

Nov. 16, 2017 (CN) .......................... 2017 1 1138023

(51) Int. Cl.
| | | |
|---|---|---|
| C08K 5/053 | (2006.01) | |
| C08K 5/00 | (2006.01) | |
| C08L 57/10 | (2006.01) | |
| C08K 5/06 | (2006.01) | |
| C08J 5/24 | (2006.01) | |
| G01N 21/35 | (2014.01) | |
| G01N 30/00 | (2006.01) | |

(52) U.S. Cl.
CPC .............. C08K 5/0025 (2013.01); C08J 5/24 (2013.01); C08K 5/053 (2013.01); C08K 5/06 (2013.01); C08L 57/10 (2013.01); *C08J 2371/12* (2013.01); *C08J 2425/10* (2013.01); *G01N 2021/3595* (2013.01); *G01N 2030/486* (2013.01)

(58) Field of Classification Search
CPC ......... C08K 5/0025; C08F 36/00; C08F 36/22
See application file for complete search history.

(56) References Cited

FOREIGN PATENT DOCUMENTS

CN          103756315       *    4/2014

OTHER PUBLICATIONS

Vani, Progress in Organic Coatings, vol. 21 (1993) p. 339-352 (Year: 1993).*
Translation of CN 103756315 (Year: 2014).*

* cited by examiner

*Primary Examiner* — Robert C Boyle
(74) *Attorney, Agent, or Firm* — Muncy, Geissler, Olds & Lowe, P.C.

(57) ABSTRACT

Disclosed herein is a resin composition, comprising: a crosslinking agent, its prepolymer, or a combination thereof; and a first unsaturated bond-containing resin. The resin composition may be used to make various articles, such as a prepreg, a resin film, a resin-coated copper, a laminate or a printed circuit board and achieve improvement in at least one, more or all properties including volatile content of prepreg, stickiness of prepreg, resin filling property of prepreg, glass transition temperature, dimensional stability under heat, T288 thermal resistance, thermal resistance after moisture absorption, dielectric constant and dissipation factor.

13 Claims, 2 Drawing Sheets

RESIN COMPOSITION AND ARTICLE MADE THEREFROM

CROSS-REFERENCE TO RELATED APPLICATION

This application claims the priority benefits of China Patent Application No. 201711138023.9, filed on Nov. 16, 2017. The entirety the above-mentioned patent application is hereby incorporated by reference herein and made a part of this specification.

BACKGROUND

1. Field of the Disclosure

The present disclosure relates to a resin composition and more particularly to a resin composition useful for preparing an article such as a prepreg, a resin film, a resin-coated copper, a laminate or a printed circuit board.

2. Description of Related Art

With the rapid advancement of electronic technology, information processing in mobile communication, servers, cloud storage and other electronic products has been incessantly directed toward high frequency signal transmission and high speed digitalization, and low dielectric resin material has become the mainstream for the development of laminates for high speed data transmission in order to satisfy the demands of high speed information transmission. Therefore, there is a need for developing materials suitable for a high performance printed circuit board.

Conventionally, maleimide resin has been used to make laminates and printed circuit boards because laminates and printed circuit boards made therefrom have high glass transition temperature and high thermal resistance. However, maleimide resin is unsatisfactory for its poor cross-linking reactivity, poor solubility (e.g., precipitation) and higher costs. Diallyl bisphenol A (DABPA) has been used to modify maleimide to lower its costs and improve its operability, toughness and thermal resistance. However, DABPA-modified maleimide resin has higher dielectric constant, higher dissipation factor and poor thermal resistance after moisture absorption. On the other hand, solely using diallyl bisphenol A without using maleimide resin will cause the problems of low glass transition temperature, poor thermal resistance and stickiness of prepregs.

SUMMARY

In view of the aforesaid problems, particularly the deficiency of known materials failing to meet the need of one or more properties of volatile content of prepregs, minimized stickiness of prepregs, resin filling property of prepregs, glass transition temperature, dimensional stability under heat, T288 thermal resistance, thermal resistance after moisture absorption, dielectric constant and dissipation factor, disclosed herein is a resin composition, comprising: (A) a crosslinking agent, its prepolymer, or a combination thereof, and (B) a first unsaturated bond-containing resin; wherein the crosslinking agent comprises a monomer represented by formula (I), its oligomer, its polymer or a combination thereof:

wherein X in formula (I) individually represent a double bond-containing functional group or hydrogen, and not all X are hydrogen at the same time. In other words, at least one X in formula (I) is the double bond-containing functional group.

Examples of X include the functional groups represented by formula (II) to formula (IV):

wherein $R_1$ to $R_{13}$ each represent hydrogen, halogen, an alkyl group or a haloalkyl group, and Q is a covalent bond or a functional group with at least one carbon atom.

In the resin composition disclosed herein, component (A) may be a crosslinking agent, a prepolymer of crosslinking agent, or a combination thereof, and the crosslinking agent may be a monomer represented by formula (I), its oligomer, its polymer or a combination thereof. For example, the crosslinking agent may comprise a monomer represented by any one of formula (V) to formula (VII), its oligomer, its polymer or a combination thereof:

(V)

(VI)

(VII)

For example, as the component (A), the prepolymer of crosslinking agent may be a prepolymer of a monomer represented by formula (I), its oligomer, its polymer or a combination thereof and a second unsaturated bond-containing resin. As used herein, prepolymer represents the product of two or more compounds which have been partially reacted. Prepolymer has a molecular weight of greater than that of each compound. Unless otherwise specified, the product produced by partial reaction may be obtained from partially crosslinking a monomer represented by formula (I), its oligomer, its polymer or a combination thereof with a second unsaturated bond-containing resin, and the conversion rate may range from 1% to 99%, preferably between 10% and 70%.

Examples of the second unsaturated bond-containing resin are not particularly limited and may comprise various unsaturated bond-containing resins known in the art, including but not limited to divinylbenzene (DVB), bis(vinylbenzyl) ether (BVBE), 1,2-bis(vinylphenyl) ethane (BVPE), triallyl isocyanurate (TAIC), prepolymer of triallyl isocyanurate (pre-polymer TAIC), triallyl cyanurate (TAC), prepolymer of triallyl cyanurate (pre-polymer TAC), 1,2,4-trivinyl cyclohexane (TVCH), vinyl benzyl maleimide (VBM), diallyl bisphenol A (DABPA), styrene, acrylate (e.g., methacrylate, tricyclodecane dimethacrylate or trimethacrylate), vinyl-containing polyphenylene oxide resin, maleimide resin, polyolefin, or a combination thereof.

Preferably, as the component (A), the prepolymer of crosslinking agent may be a prepolymer of a monomer represented by formula (I), its oligomer, its polymer or a combination thereof and maleimide resin.

Specifically, disclosed herein is a prepolymer of a monomer represented by formula (I), its oligomer, its polymer or a combination thereof and maleimide resin, wherein X individually represent a double bond-containing functional group or hydrogen, and not all X are hydrogen at the same time. In other words, at least one X in formula (I) is a double bond-containing functional group.

(I)

In the resin composition disclosed herein, the component (B) may be any unsaturated bond-containing resin. In other words, examples of the first unsaturated bond-containing resin are not particularly limited and may comprise various unsaturated bond-containing resins known in the art, including but not limited to divinylbenzene, bis(vinylbenzyl) ether, 1,2-bis(vinylphenyl) ethane, triallyl isocyanurate, prepolymer of triallyl isocyanurate, triallyl cyanurate, prepolymer of triallyl cyanurate, 1,2,4-trivinyl cyclohexane, vinyl benzyl maleimide, diallyl bisphenol A, styrene, acrylate (e.g., methacrylate, tricyclodecane dimethacrylate or trimethacrylate), vinyl-containing polyphenylene oxide resin, maleimide resin, polyolefin, or a combination thereof.

Unless otherwise specified, the aforesaid unsaturated bond-containing resin, either the first unsaturated bond-containing resin or the second unsaturated bond-containing resin, may be present as a monomer, an oligomer, a polymer, a combination thereof or a prepolymer thereof. For example, both the first unsaturated bond-containing resin and the second unsaturated bond-containing resin may comprise one or more monomers, oligomers, polymers, prepolymers or any combination thereof.

In addition to the aforesaid component (A) and component (B), the resin composition may optionally further comprise epoxy resin, cyanate ester resin, phenolic resin, benzoxazine resin, styrene maleic anhydride resin, polyester, amine curing agent, polyamide, polyimide or a combination thereof.

In addition to the aforesaid component (A) and component (B), the resin composition may optionally further comprise flame retardant, inorganic filler, curing accelerator, solvent, silane coupling agent, surfactant, coloring agent, toughening agent or a combination thereof.

Unless otherwise specified, the ratio or content of different components in the resin composition may be adjusted according to needs. Preferably, the resin composition comprises 5 parts by weight to 40 parts by weight of the crosslinking agent, its prepolymer, or a combination thereof, and 50 parts by weight to 100 parts by weight of the first unsaturated bond-containing resin.

For example, the resin composition may comprise 5 parts by weight to 40 parts by weight of the prepolymer of the crosslinking agent, and 50 parts by weight to 100 parts by weight of the first unsaturated bond-containing resin.

For example, the resin composition may also comprise 10 parts by weight to 30 parts by weight of a prepolymer of the crosslinking agent and maleimide resin, and 50 parts by weight to 100 parts by weight of the first unsaturated bond-containing resin.

The resin compositions of various embodiments may be useful for making different articles, including but not limited to a prepreg, a resin film, a resin-coated copper, a laminate or a printed circuit board.

In a preferred embodiment, articles made from the resin composition disclosed herein have one, more or all of the following properties:
- a glass transition temperature as measured using a dynamic mechanical analyzer (DMA) by reference to IPC-TM-650 2.4.24.4 of greater than or equal to 200° C.;
- a rate of dimensional change in Z-axis as measured using a thermomechanical analyzer (TMA) by reference to IPC-TM-650 2.4.24.5 of less than or equal to 3.0%;
- a T288 thermal resistance as measured by reference to IPC-TM-650 2.4.24.1 of greater than or equal to 60 minutes;
- a thermal resistance after moisture absorption as measured by reference to IPC-TM-650 2.6.16.1 and IPC-TM-650 2.4.23 of greater than or equal to 5 hours;
- a volatile content as measured by reference to IPC-TM-650 2.3.19 of less than or equal to 1.0%;
- a dielectric constant at 10 GHz as measured by reference to JIS C2565 of less than or equal to 3.8; and
- a dissipation factor at 10 GHz as measured by reference to JIS C2565 of less than or equal to 0.0065.

DETAILED DESCRIPTION OF EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, "a," "an" or similar expression is employed to describe elements and features of the present disclosure. This is done merely for convenience and to give a general sense of the scope of the present disclosure. Accordingly, this description should be read to include one or at least one and the singular also includes the plural unless it is obvious to mean otherwise.

As used herein, the term "comprises," "comprising," "includes," "including," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" or "between 1 and 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$" and Y is described as being "selected from a group consisting of $Y_1$, $Y_2$ and $Y_3$," the disclosure encompasses any combination of X is $X_1$ and/or $X_2$ and/or $X_3$ and Y is $Y_1$ and/or $Y_2$ and/or $Y_3$.

The following embodiments and examples are illustrative in nature and are not intended to limit the present disclosure and its application. In addition, the present disclosure is not bound by any theory described in the background and summary above or the following embodiments or examples.

Crosslinking Agent

A crosslinking agent represents a component capable of crosslinking the unsaturated bond-containing resin of the present disclosure. Unless otherwise specified, the crosslinking agent may be a compound or a mixture. A compound may be present as a monomer (e.g., a small molecule compound), an oligomer or a polymer. A mixture refers to the inclusion of two or more different compounds, such as containing two or more different monomers, oligomers, polymers or any combination thereof.

Specifically, the crosslinking agent disclosed herein may comprise a monomer represented by formula (I), its oligomer, its polymer or a combination thereof:

(I)

wherein X in formula (I) individually represent a double bond-containing (e.g., C=C double bond) functional group or hydrogen, and not all X are hydrogen at the same time. In other words, at least one X in formula (I) is a double bond-containing functional group. For example, X may individually represent any one of a vinyl group, an allyl group, a vinylbenzyl group, an acryl group and a methacryl group, but not limited thereto.

For example, the double bond-containing functional group is represented by any one of formula (II) to formula (IV):

(II)

(III)

(IV)

wherein $R_1$ to $R_{13}$ each represent hydrogen, halogen, an alkyl group or a haloalkyl group, and Q is a covalent bond or a functional group with at least one carbon atom.

As used herein, unless otherwise specified, halogen comprises F, Cl, Br and I.

As used herein, unless otherwise specified, an alkyl group represents a straight-chain or branched saturated hydrocarbyl group, such as a $C_1$ to $C_6$ saturated hydrocarbyl group, including but not limited to methyl, ethyl, n-propyl, isopropyl, butyl, pentyl, hexyl, etc. A haloalkyl group refers to an alkyl group with one or more hydrogen atoms substituted by F, Cl, Br or I.

For example, Q may be a covalent bond or a bivalent or trivalent hydrocarbyl group with at least one carbon atom, such as $C_1$ to $C_6$ bivalent hydrocarbyl group, such as $C_1$ to $C_6$ bivalent alkyl group or bivalent alkenyl group. Examples of Q include, but not limited to, methylene, ethylene, propylene, butylene, pentylene, hexylene, etc.

Specifically, the crosslinking agent disclosed herein preferably comprises a monomer represented by any one of formula (V) to formula (VII), its oligomer, its polymer or a combination thereof:

(V)

(VI)

(VII)

As described above, the crosslinking agent may be a monomer, as shown by formula (I), and the crosslinking agent may also be an oligomer or polymer of the monomer.

In another aspect, disclosed herein is a prepolymer of a monomer represented by formula (I), its oligomer, its polymer or a combination thereof and maleimide resin, wherein X individually represent a double bond-containing functional group or hydrogen, and not all X are hydrogen at the same time. In other words, at least one X in formula (I) is a double bond-containing functional group:

(I)

In one embodiment, the prepolymer of crosslinking agent may comprise a prepolymer of the monomer represented by formula (I), its oligomer, its polymer or a combination thereof and a second unsaturated bond-containing resin.

For example, the second unsaturated bond-containing resin comprises divinylbenzene, bis(vinylbenzyl) ether, 1,2-bis(vinylphenyl) ethane, triallyl isocyanurate, prepolymer of triallyl isocyanurate, triallyl cyanurate, prepolymer of triallyl cyanurate, 1,2,4-trivinyl cyclohexane, vinyl benzyl maleimide, diallyl bisphenol A, styrene, acrylate, vinyl-containing polyphenylene oxide resin, maleimide resin, polyolefin, or a combination thereof.

For example, the prepolymer of crosslinking agent may comprise a prepolymer formed by a monomer represented by formula (I), its oligomer, its polymer or a combination thereof and vinyl-containing polyphenylene oxide resin, maleimide resin, polyolefin or a combination thereof.

Unless otherwise specified, a maleimide resin used in the present disclosure is not particularly limited. A maleimide resin refers to a monomer containing at least one maleimide group, its oligomer, its polymer or a combination thereof. For example, the maleimide resin used in the present disclosure may include any one or more maleimide resins useful for preparing a prepreg, a resin film, a resin-coated copper, a laminate or a printed circuit board.

Examples of maleimide resin include but are not limited to 4,4'-diphenylmethane bismaleimide, oligomer of phenylmethane maleimide, polyphenylmethane maleimide, m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, 1,6-bismaleimide-(2,2,4-trimethyl hexane), N-2,3-xylylmaleimide, N-2,6-xylenemaleimide, N-phenylmaleimide, maleimide compound containing aliphatic long chain structure, prepolymer thereof and a combination thereof.

For example, the aforesaid prepolymer of maleimide resin may be a prepolymer of diallyl compound and maleimide compound, a prepolymer of diamine and maleimide compound, a prepolymer of multi-functional amine and maleimide compound or a prepolymer of acid phenol compound and maleimide compound.

For example, the maleimide resin may include products such as BMI-70, BMI-80, BMI-1000, BMI-1000H, BMI-1100, BMI-1100H, BMI-2000, BMI-2300, BMI-3000, BMI-3000H, BMI-4000H, BMI-5000, BMI-5100, BMI-7000 and BMI-7000H available from Daiwa Kasei Co., Ltd.

For example, the maleimide resin containing aliphatic long chain structure may include products such as BMI-689, BMI-1400, BMI-1500, BMI-1700, BMI-2500, BMI-3000, BMI-5000 and BMI-6000 available from Designer Molecules Inc.

Unless otherwise specified, the vinyl-containing polyphenylene oxide resin used in the present disclosure is not particularly limited and may include any one or more polyphenylene oxide resins or polyphenylene ether resins useful for preparing a prepreg, a resin film, a resin-coated copper, a laminate or a printed circuit board. Examples of the vinyl-containing polyphenylene oxide resin comprises, but not limited to, bis(vinylbenzyl) polyphenylene oxide resin (e.g., OPE-2st, available from Mitsubishi Gas Chemical Co., Inc.), methacrylate polyphenylene oxide resin (e.g., SA-9000, available from SABIC), vinylbenzyl-modified bisphenol A polyphenylene oxide or chain-extended polyphenylene oxide. For example, the chain-extended polyphenylene oxide may include various polyphenylene oxide resins disclosed in the US Patent Application Publication No. 2016/0185904 A1, all of which are incorporated herein by reference in their entirety.

Unless otherwise specified, the polyolefin used in the present disclosure is not particularly limited and may include any one or more polyolefins useful for preparing a prepreg, a resin film, a resin-coated copper, a laminate or a printed circuit board. Examples of polyolefin include but are not limited to styrene-butadiene-divinylbenzene terpolymer, styrene-butadiene-maleic anhydride terpolymer, vinyl-polybutadiene-urethane oligomer, styrene butadiene copolymer, hydrogenated styrene butadiene copolymer, styrene isoprene copolymer, hydrogenated styrene isoprene copolymer, polybutadiene, methylstyrene copolymer, petroleum resin, cycloolefin copolymer and a combination thereof.

Also disclosed herein is a method of preparing the crosslinking agent comprising a monomer represented by formula (I), its oligomer, its polymer or a combination thereof, comprising a step of reacting diallyl bisphenol A and vinyl-containing halide.

In one embodiment, a proper amount of solvent is added during the reaction of diallyl bisphenol A and vinyl-containing halide, examples including but not limited to ketones (e.g., acetone or methyl ethyl ketone), toluene or a combination thereof.

In one embodiment, the vinyl-containing halide preferably comprises a vinyl-containing chloride. For example, the vinyl-containing halide may be, but not limited to, vinylbenzyl chloride, vinyl chloride, allyl chloride, acryloyl chloride, methacryloyl chloride or a combination thereof.

In one embodiment, substitution occurs between the chlorine atom of the vinyl-containing chloride and at least one hydroxyl group of diallyl bisphenol A. For example, substitution occurs between chlorine atoms of two identical or different vinyl-containing chlorides and two hydroxyl groups of diallyl bisphenol A. For example, substitution of two identical vinylbenzyl chlorides and two hydroxyl groups of diallyl bisphenol A may produce a crosslinking agent compound represented by formula (V).

In one embodiment, a phase transfer catalyst is added during the reaction of diallyl bisphenol A and vinyl-containing halide, examples including but not limited to tetrabutylammonium bromide.

In one embodiment, an alkaline solution is added during the reaction of diallyl bisphenol A and vinyl-containing halide, examples including but not limited to sodium hydroxide solution, potassium hydroxide solution, triethylamine and potassium tert-butoxide.

In one embodiment, 15 to 60 parts by weight of diallyl bisphenol A is reacted with 10 to 100 parts by weight of vinyl-containing halide to obtain a crosslinking agent comprising a monomer represented by formula (I), its oligomer, its polymer or a combination thereof.

In one embodiment, the reaction of diallyl bisphenol A and vinyl-containing halide is conducted at a temperature of 40° C. to 120° C. (e.g., 60° C. to 120° C.) for a period of 1 to 8 hours.

In one embodiment, the product obtained from the reaction of diallyl bisphenol A and vinyl-containing halide is washed with water and purified.

In one embodiment, diallyl bisphenol A, vinylbenzyl chloride and toluene are added to a reaction tank, which is then added with an alkaline sodium hydroxide solution, stirred and mixed, added with a phase transfer catalyst tetrabutylammonium bromide, and then heated to 80° C. and kept stirred for another 4 hours, followed by water washing and purification, so as to obtain a crosslinking agent represented by formula (V).

Also disclosed herein is a method of preparing a prepolymer of the crosslinking agent comprising a monomer represented by formula (I), its oligomer, its polymer or a combination thereof, comprising: at a temperature of 50° C. to 150° C., using a diazo initiator or a peroxide initiator to induce a pre-polymerization reaction for 2 to 8 hours of any one of the aforesaid crosslinking agents and any one of the aforesaid second unsaturated bond-containing resins, such as but not limited to maleimide resin (e.g., BMI-70), so as to obtain a prepolymer of the crosslinking agent disclosed herein.

The aforesaid diazo initiator may be, but not limited to, azobisisobutyronitrile.

The peroxide initiator may be, but not limited to, dibenzoyl peroxide.

In one embodiment, during the pre-polymerization reaction, the weight ratio of any one of the aforesaid crosslinking agents and any one of the aforesaid second unsaturated bond-containing resins may be from 1:8 to 8:1, such as 1:8, 1:6, 1:4, 1:2, 1:1, 2:1, 4:1, 6:1 or 8:1.

Resin Composition

Disclosed herein is a resin composition comprising: the aforesaid crosslinking agent, its prepolymer, or a combination thereof; and a first unsaturated bond-containing resin.

In other words, the resin composition may comprise any one or more of the aforesaid crosslinking agents and a first unsaturated bond-containing resin; alternatively, the resin composition may comprise a prepolymer of any one or more of the aforesaid crosslinking agents and a first unsaturated bond-containing resin; alternatively, the resin composition may comprise any one or more of the aforesaid crosslinking agents, a prepolymer of any one or more of the aforesaid crosslinking agents and a first unsaturated bond-containing resin. If the resin composition comprises both the crosslinking agent and the prepolymer of the crosslinking agent, the weight ratio therebetween may be between 1:10 and 10:1.

Examples of the first unsaturated bond-containing resin include any kind of the second unsaturated bond-containing resins described above or a combination thereof. For example, the first unsaturated bond-containing resin may comprise divinylbenzene, bis(vinylbenzyl) ether, 1,2-bis(vinylphenyl) ethane, triallyl isocyanurate, prepolymer of triallyl isocyanurate, triallyl cyanurate, prepolymer of triallyl cyanurate, 1,2,4-trivinyl cyclohexane, vinyl benzyl maleimide, diallyl bisphenol A, styrene, acrylate, vinyl-containing polyphenylene oxide resin, maleimide resin, polyolefin, or a combination thereof. In addition, examples of the first unsaturated bond-containing resin are as described above, such as maleimide resin, vinyl-containing polyphenylene oxide resin, polyolefin and other examples elaborated above, which are applicable to both the first unsaturated bond-containing resin and the second unsaturated bond-containing resin.

Unless otherwise specified, the amount and ratio of the crosslinking agent, its prepolymer, or a combination thereof and the first unsaturated bond-containing resin may be adjusted according to needs.

For example, relative to 1 to 100 parts by weight of the crosslinking agent, its prepolymer, or a combination thereof, in various embodiments of the present disclosure, the resin composition may comprise 1 to 100 parts by weight of the maleimide resin, such as 50 to 100 parts by weight of the maleimide resin, or such as 5 to 50 parts by weight of the maleimide resin.

For example, relative to 1 to 100 parts by weight of the crosslinking agent, its prepolymer, or a combination thereof, in various embodiments of the present disclosure, the resin composition may comprise 1 to 100 parts by weight of the vinyl-containing polyphenylene oxide resin, such as 50 to 100 parts by weight of the vinyl-containing polyphenylene oxide resin, or such as 20 to 80 parts by weight of the vinyl-containing polyphenylene oxide resin, or such as 30 to 50 parts by weight of the vinyl-containing polyphenylene oxide resin.

For example, relative to 1 to 100 parts by weight of the crosslinking agent, its prepolymer, or a combination thereof, in various embodiments of the present disclosure, the resin composition may comprise 1 to 100 parts by weight of the polyolefin, such as 5 to 50 parts by weight of the polyolefin.

In one embodiment, the resin composition comprises 5 parts by weight to 40 parts by weight of the crosslinking agent, its prepolymer, or a combination thereof, and 50 parts by weight to 100 parts by weight of the first unsaturated bond-containing resin.

In one embodiment, the resin composition comprises 5 parts by weight to 30 parts by weight of the crosslinking agent, its prepolymer, or a combination thereof, and 50 parts by weight to 100 parts by weight of the first unsaturated bond-containing resin.

In one preferred embodiment, the resin composition comprises 5 parts by weight to 40 parts by weight of the prepolymer of crosslinking agent and 50 parts by weight to 100 parts by weight of the first unsaturated bond-containing resin.

In one preferred embodiment, the resin composition comprises 10 parts by weight to 30 parts by weight of the prepolymer of crosslinking agent and 50 parts by weight to 100 parts by weight of the first unsaturated bond-containing resin.

In addition to the aforesaid two components, the resin composition may optionally further comprise epoxy resin, cyanate ester resin, phenolic resin, benzoxazine resin, styrene maleic anhydride resin, polyester, amine curing agent, polyamide, polyimide or a combination thereof. Unless otherwise specified, relative to a total of 1 to 100 parts by weight of the crosslinking agent and the first unsaturated bond-containing resin, any additional components described above may be used at an amount of 1 to 100 parts by weight.

For example, the epoxy resin may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be any one, two or more selected from DOPO-containing phenolic novolac epoxy resin, DOPO-containing cresol novolac epoxy resin and DOPO-containing bisphenol-A novolac epoxy resin; the DOPO-HQ epoxy resin may be any one, two or more selected from DOPO-HQ-containing phenolic novolac epoxy resin, DOPO-HQ-containing cresol novolac epoxy resin and DOPO-HQ-containing bisphenol-A novolac epoxy resin.

For example, the cyanate ester resin is not particularly limited and may be any compound with an Ar—O—C≡N structure, wherein Ar represents a substituted or unsubstituted aromatic group, novolac, bisphenol A, bisphenol A novolac, bisphenol F, bisphenol F novolac or phenolphthalein. For example, the cyanate ester resin may be available under the tradename Primaset PT-15, PT-30S, PT-60S, CT-90, BADCY, BA-100-10T, BA-200, BA-230S, BA-300S, BTP-2500, BTP-6020S, DT-4000, DT-7000, Methylcy, ME-240S, etc. available from Lonza.

For example, the phenolic resin may comprise but not limited to mono-functional, bifunctional or multifunctional phenolic resin, comprising phenolic resin of a resin composition conventionally useful for making prepregs, such as phenoxy resin, phenol novolac resin, etc.

For example, the benzoxazine resin includes, but not limited to, bisphenol A benzoxazine resin, bisphenol F benzoxazine resin, phenolphthalein benzoxazine resin, dicyclopentadiene benzoxazine resin, phosphorus-containing benzoxazine resin, oxydianiline benzoxazine resin, or unsaturated bond containing benzoxazine resin, such as but not limited to LZ-8270, LZ-8280 or LZ-8290 available from Huntsman or HFB-2006M available from Showa High Polymer.

For example, in the aforesaid styrene maleic anhydride resin, the ratio of styrene (S) and maleic anhydride (MA) may be for example 1/1, 2/1, 3/1, 4/1, 6/1, 8/1 or 12/1, including styrene maleic anhydride copolymers such as SMA-1000, SMA-2000, SMA-3000, EF-30, EF-40, EF-60 and EF-80 available from Cray Valley.

For example, the polyester may be prepared by esterification of dicarboxylic aromatic compounds with dihydroxyl aromatic compounds. Examples include, but not limited to, HPC-8000T65, available from DIC Corporation.

For example, the amine curing agent may include, but not limited to, any one or a combination of diamino diphenyl sulfone, diamino diphenyl methane, diamino diphenyl ether, diamino diphenyl sulfide and dicyandiamide (DICY).

For example, the polyamide may be any polyamide resin known in the field to which this disclosure pertains, including but not limited to various commercially available polyamide resin products.

For example, the polyimide may be any polyimide resin known in the field to which this disclosure pertains, including but not limited to various commercially available polyimide resin products.

In addition to the aforesaid components, the resin composition may optionally further comprise flame retardant, inorganic filler, curing accelerator, solvent, silane coupling agent, surfactant, coloring agent, toughening agent or a combination thereof. Unless otherwise specified, relative to a total of 1 to 100 parts by weight of the crosslinking agent and the first unsaturated bond-containing resin, any additional components described above may be used at an amount of 1 to 100 parts by weight.

For example, relative to a total of 100 parts by weight of the crosslinking agent, its prepolymer, or a combination thereof and the first unsaturated bond-containing resin, the amount of flame retardant used in the present disclosure is not particularly limited, and may range from 1 to 100 parts by weight.

The flame retardant used herein may be any one or more flame retardants useful for preparing a prepreg, a resin film, a resin-coated copper, a laminate or a printed circuit board; examples of flame retardant include but are not limited to phosphorus-containing flame retardant, preferably any one, two or more selected from the following group: ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives or resins, DPPO (diphenylphosphine oxide) and its derivatives or resins, melamine cyanurate, tri-hydroxy ethyl isocyanurate and aluminium phosphinate (e.g., commercially available OP-930 and OP-935).

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a bisphenol novolac compound, such as DOPO-BPAN (DOPO-bisphenol A novolac), DOPO-BPFN (DOPO-bisphenol F novolac) and DOPO-BPSN (DOPO-bisphenol S novolac).

Unless otherwise specified, relative to a total of 100 parts by weight of the crosslinking agent, its prepolymer, or a combination thereof and the first unsaturated bond-containing resin, the amount of inorganic filler used in the present disclosure is not particularly limited, and may range from 10 to 300 parts by weight.

The inorganic filler may be any one or more inorganic fillers useful for preparing a prepreg, a resin film, a resin-coated copper, a laminate or a printed circuit board; examples of inorganic filler include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride and calcined kaolin. Moreover, the inorganic filler can be spherical, fibrous, plate-like, particulate, sheet-like or whisker-like and can be optionally pretreated by a silane coupling agent.

For example, the curing accelerator (e.g., curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. Preferably, the curing accelerator (e.g., curing initiator) may comprise a peroxide capable of producing free radicals, including but not limited to dicumyl peroxide, tert-butyl peroxybenzoate, dibenzoyl peroxide (BPO), 2,5-dimethyl-2,5-di(tert-butylperoxy)-3-hexyne (25B), bis(tert-butylperoxyisopropyl)benzene or a combination thereof.

The purpose of adding solvent is to change the solid content of the resin composition and to adjust the viscosity of the resin composition. For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

Silane coupling agent may comprise silane (such as but not limited to siloxane), which may be further categorized according to the functional groups into amino silane, epoxide silane, vinyl silane, ester silane, hydroxyl silane, isocyanate silane, methacryloxy silane and acryloxy silane.

The purpose of surfactant is to ensure uniform distribution of the inorganic filler in the resin composition.

For example, the coloring agent (i.e., staining agent) may comprise, but not limited to, dye or pigment.

The purpose of adding toughening agent is to improve the toughness of the resin composition. The toughening agent may comprise, but not limited to, rubber resin, carboxyl-terminated butadiene acrylonitrile rubber (CTBN rubber), core-shell rubber, or a combination thereof.

Articles Made from Resin Compositions

The resin compositions of various embodiments may be processed by various methods into different articles, including but not limited to a prepreg, a resin film, a resin-coated copper, a laminate or a printed circuit board.

For example, the resin compositions of various embodiments may be used to make prepregs.

For example, by well mixing the resin composition to form a varnish, loading the varnish into an impregnation tank, impregnating a fiberglass fabric into the impregnation tank to adhere the resin composition onto the fiberglass fabric, and proceeding with heating and baking at a proper temperature to a semi-cured state, a prepreg may be obtained.

In one embodiment, the prepreg has a reinforcement material and a layered structure formed thereon, wherein the layered structure is made by heating the resin composition to a semi-cured state (B-stage). Suitable baking temperature for making the prepreg may be for example 120° C. to 180° C. For example, the reinforcement material may be any one of a fiber material, woven fabric, non-woven fabric, liquid crystal resin film, polyester (PET) film and polyimide (PI) film, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or NE-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pretreated by a silane coupling agent. The prepreg may be further heated and cured to the C-stage to form an insulation layer.

The article made from the resin composition may also be a resin film, which is made by heating and baking the resin composition to a semi-cured state, such as by selectively coating the resin composition on a polyethylene terephthalate film (PET film) or a polyimide film, followed by heating and baking to a semi-cured state to obtain the resin film.

In one embodiment for making the resin-coated copper, the resin composition from each embodiment is coated on a copper foil to uniformly adhere the resin composition thereon, followed by heating and baking to a semi-cured state to obtain the resin-coated copper.

In one embodiment, the resin composition of the present disclosure may be made into a laminate, such as a copper-clad laminate, which comprises two copper foils and an insulation layer disposed between the copper foils, wherein the insulation layer is made by curing the resin composition at high temperature and high pressure, a suitable curing temperature being for example between 190° C. and 220° C. and preferably between 200° C. and 210° C. and a suitable curing time being 90 to 180 minutes and preferably 120 to 150 minutes. The insulation layer may be obtained by curing the aforesaid prepreg or resin film. The metal foil may be copper, aluminum, nickel, platinum, silver, gold or alloy thereof, such as a copper foil. In a preferred embodiment, the laminate is a copper-clad laminate.

In one embodiment, the laminate may be further processed by trace formation processes to obtain a printed circuit board.

For example, a double-sided copper-clad laminate (such as product name EM-827, available from Elite Material Co., Ltd.) with a thickness of 28 mil and having a 1 ounce (oz) HTE (high temperature elongation) copper foil may be provided and subject to drilling and then electroplating, so as to form electrical conduction between the upper layer copper foil and the bottom layer copper foil. Then etch the upper layer copper foil and the bottom layer copper foil to form inner layer circuits. Then perform brown oxidation and roughening on the inner layer circuits to form uneven structure on the surface to increase roughness. Next, a vacuum lamination apparatus is used to laminate the assembly of a copper foil, the prepreg, the inner layer circuits, the prepreg and a copper foil stacked in said order by heating at 190° C. to 220° C. for 90 to 180 minutes to cure the insulation material of the prepregs. Next, perform black oxidation, drilling, copper plating and other known circuit board processes on the outmost ultra-thin copper foil so as to obtain the printed circuit board.

For example, the resin composition of the present disclosure and various articles made therefrom may have any one or a combination of the following properties:

a glass transition temperature as measured using a dynamic mechanical analyzer by reference to IPC-TM-650 2.4.24.4 of greater than or equal to 200° C., such as a glass transition temperature of between 200° C. and 240° C., such as between 220° C. and 235° C.;

a rate of dimensional change in Z-axis as measured using a thermomechanical analyzer by reference to IPC-TM-650 2.4.24.5 of less than or equal to 3.0%, such as a rate of dimensional change in Z-axis of between 2.0% and 3.0%, such as between 2.2% and 2.5%;

a T288 thermal resistance as measured by reference to IPC-TM-650 2.4.24.1 of greater than or equal to 60 minutes, such as greater than or equal to 60 minutes, 90 minutes, 120 minutes, or 180 minutes;

a thermal resistance after moisture absorption (PCT) as measured by reference to IPC-TM-650 2.6.16.1 and IPC-TM-650 2.4.23 of greater than or equal to 5 hours, such as greater than or equal to 7 hours or greater than or equal to 10 hours; in one embodiment, a laminate made from the resin composition has a thermal resistance after moisture absorption as measured by reference to IPC-TM-650 2.6.16.1 and IPC-TM-650 2.4.23 of greater than or equal to 5 hours without delamination or blistering, wherein delamination represents at least partial separation between insulation layers of the laminate;

a volatile content as measured by reference to IPC-TM-650 2.3.19 of less than or equal to 1.0%, such as less than or equal to 0.9%, such as between 0.5% and 1.0%;

a dielectric constant at 10 GHz as measured by reference to JIS C2565 of less than or equal to 3.8, such as between 3.7 and 3.8;

a dissipation factor at 10 GHz as measured by reference to JIS C2565 of less than or equal to 0.0065, such as between 0.0055 and 0.0060;

in one embodiment, after being vacuum-packed, no stickiness occurs in the prepreg after it has been placed at 35° C. for 48 hours;

in one embodiment, the prepreg has a resin filling property of greater than or equal to 90%.

EXAMPLES

Raw materials below were used to prepare the resin compositions of various Examples and Comparative Examples of the present disclosure according to the amount listed in Table 1 to Table 6 and further fabricated to prepare test samples or articles.

The names of chemicals used in the examples and comparative examples are as follows:

1. Diallyl bisphenol A: DABPA, available from Laizhou City Laiyu Chemical Co., Ltd.
2. Divinylbenzene: DVB-810, available from Nippon Steel & Sumikin Chemical.
3. Triallyl isocyanurate: TAIC, available from Kingyorker Enterprise Co. Ltd.
4. Bismaleimide: BMI-70, available from K.I Chemical Industry Co., Ltd.
5. Methacrylate-terminated polyphenylene oxide: SA-9000, available from SABIC.
6: Styrene-butadiene-divinylbenzene terpolymer: Ricon 257, available from Cray Valley.
7. Butadiene-styrene copolymer: Ricon 100, available from Cray Valley.
8. Decabromodiphenyl ethane: SAYTEX 8010, available from Albemarle.
9. Fused silica: 568, available from Sibelco.
10. 2,5-dimethyl-2,5-di(tert-butylperoxy)-3-hexyne: 25B, available from NOF Corporation.

Preparation Example 1

0.1 mole (30.8 g) of diallyl bisphenol A, 0.2 mole (35.0 g) of vinylbenzyl chloride and 80 g of toluene solvent were loaded into a stirred tank, followed by the addition of 48.0 g of 25% NaOH aqueous solution and then 16.0 g of tetrabutylammonium bromide, and the temperature was increased to 80° C. with stirring for 4 hours, followed by water washing and purification, so as to obtain Product A1, as shown by formula (V).

Figure 1:
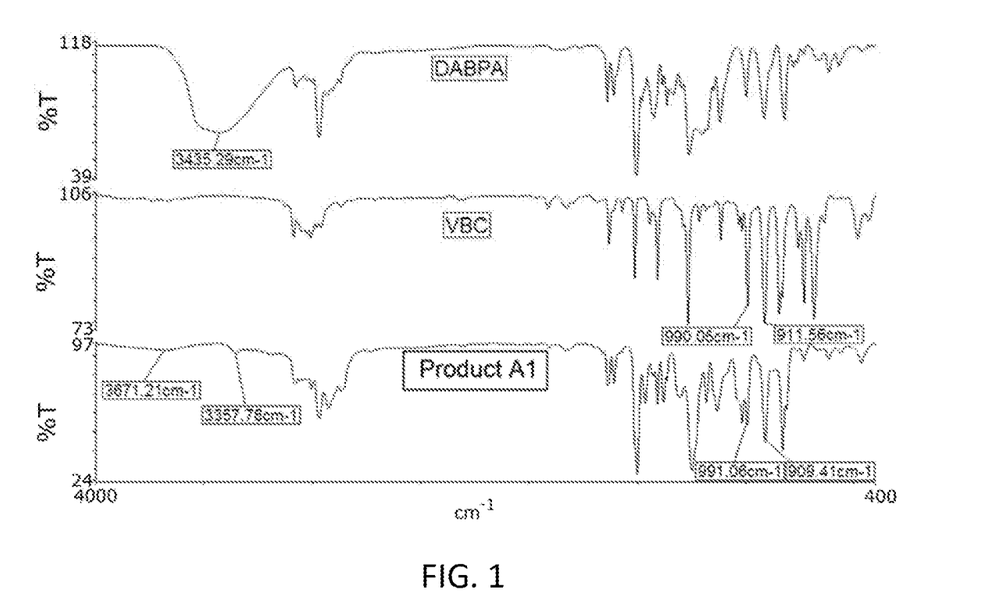
FIG. 1 illustrates the FTIR spectrum of Product A1.

Fourier transform infrared spectroscopy (FTIR) analysis of Product A1 thus prepared, as shown in FIG. 1, indicates that a vinyl characteristic peak of the vinylbenzyl chloride (VBC) appears at 991.06 cm$^{-1}$ and 909.41 cm$^{-1}$, and the characteristic peak of the phenolic hydroxyl group of the reactant diallyl bisphenol A (DABPA) at 3435.29 cm$^{-1}$ disappears, confirming that the product thus obtained is a crosslinking agent of formula (V).

Figure 2:
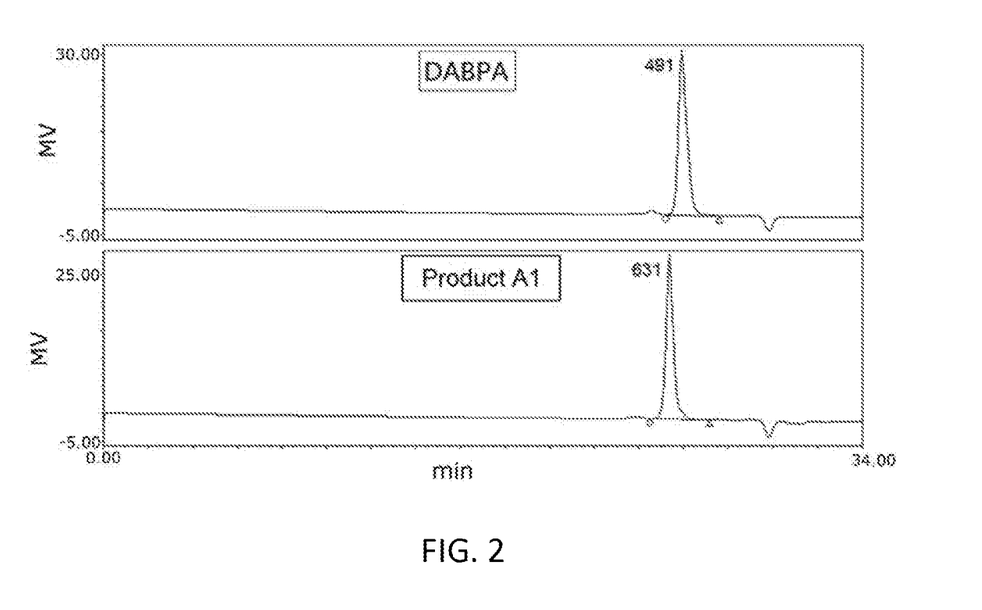
FIG. 2 illustrates the GPC spectrum of Product A1.

Gel permeation chromatography (GPC) analysis of Product A1, as shown in FIG. 2, indicates a molecular weight of 631, which is different from the molecular weight (491) of DABPA, confirming that a reaction of DABPA and VBC has been conducted and further confirming that the product thus obtained is a crosslinking agent of formula (V).

Preparation Example 2

This example is basically the same as PREPARATION EXAMPLE 1, except that 0.2 mole (35.0 g) of vinylbenzyl chloride was replaced by 0.2 mole (15.4 g) of allyl chloride, such that Product A2 was obtained, as represented by formula (VI).

Preparation Example 3

This example is basically the same as PREPARATION EXAMPLE 1, except that 0.2 mole (35.0 g) of vinylbenzyl chloride was replaced by 0.2 mole (21.0 g) of methacryloyl chloride, such that Product A3 was obtained, as represented by formula (VII).

Preparation Example 4

15 g of Product A1, 15 g of BMI-70 and 30 g of a mixture solvent of MEK and toluene (1:1) were loaded into a stirred tank, followed by the addition of 0.9 g of dibenzoyl peroxide (BPO) and then complete dissolution, and the reaction was conducted at 85° C. for 4 hours to obtain Product A4.

Figure 3:
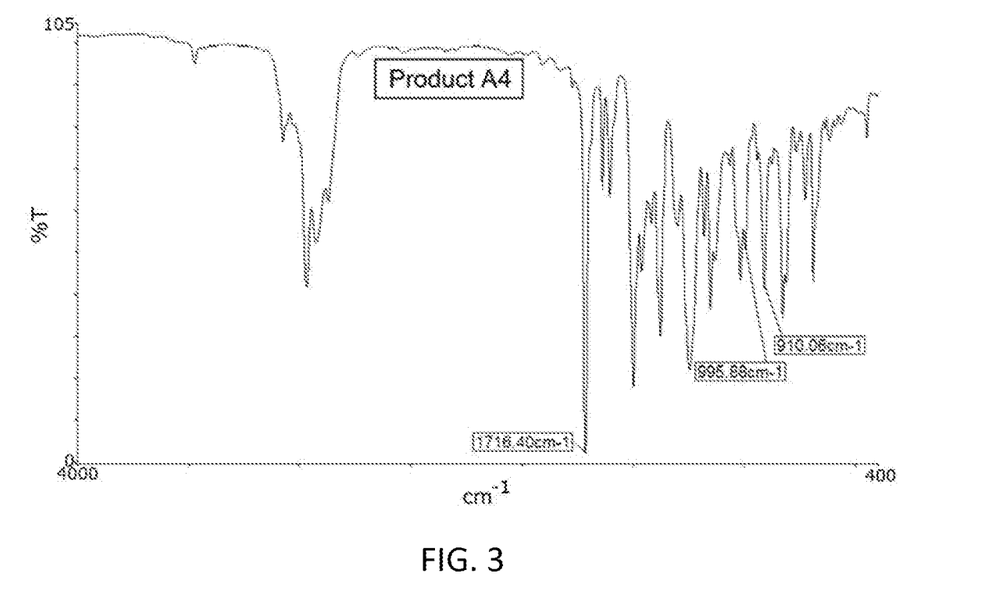
FIG. 3 illustrates the FTIR spectrum of Product A4.

Fourier transform infrared spectroscopy (FTIR) analysis of Product A4 thus prepared, as shown in FIG. 3, indicates that a characteristic peak of carbonyl group of BMI-70 appears at the 1716.40 cm$^{-1}$ in the product of PREPARATION EXAMPLE 4.

Figure 4:
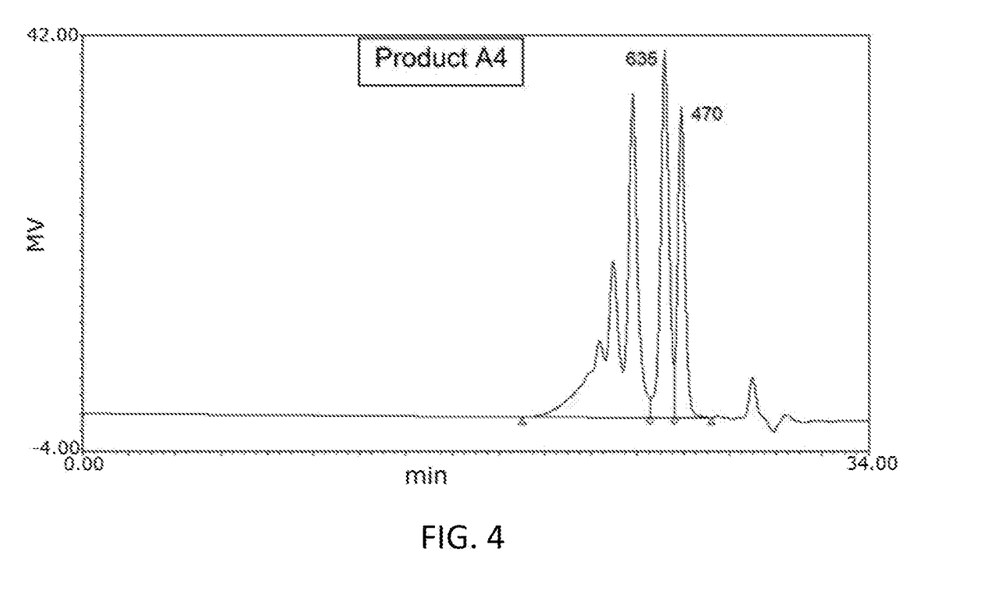
FIG. 4 illustrates the GPC spectrum of Product A4.

Gel permeation chromatography (GPC) analysis of Product A4, as shown in FIG. 4, indicates that, in addition to the characteristic peaks of Product A1 and BMI-70 not fully reacted, a prepolymer with a molecular weight of 1,000 to 5,000 was formed. This confirms that Product A4 is a prepolymer of the crosslinking agent of formula (V) and maleimide.

Preparation Example 5

This example is basically the same as PREPARATION EXAMPLE 4, except that 15 g of Product A1 was replaced by 15 g of Product A2, such that Product A5 was obtained, which is a prepolymer of the crosslinking agent of formula (VI) and maleimide.

Preparation Example 6

This example is basically the same as PREPARATION EXAMPLE 4, except that 15 g of Product A1 was replaced by 15 g of Product A3, such that Product A6 was obtained, which is a prepolymer of the crosslinking agent of formula (VII) and maleimide.

Preparation Example 7

15 g of diallyl bisphenol A (DABPA), 15 g of BMI-70, and 30 g of solvent (DMAc) were loaded into the stirred tank for reaction at 100° C. for 4 hours, followed by the addition of 0.5 g of triphenylphosphine and then complete dissolution, followed by stirring and reaction for 2 hours to obtain Product A7, which is a prepolymer of diallyl bisphenol A and maleimide.

TABLE 1

Resin compositions of Examples (in part by weight; PA represents proper amount)

| | Component | | E1 | E2 | E3 | E4 | E5 | E6 | E7 | E8 |
|---|---|---|---|---|---|---|---|---|---|---|
| crosslinking agent | vinylbenzyl-terminated DABPA | A1 | 15 | 5 | 25 | | | 15 | 10 | |
| | allyl-terminated DABPA | A2 | | | | | 15 | | | |
| | methacrylate-terminated DABPA | A3 | | | | | | 15 | | |
| | DABPA | DABPA | | | | | | | | |
| | triallyl isocyanurate | TAIC | | | | | | | | |
| | divinylbenzene | DVB-810 | | | | | | | | |
| | bismaleimide | BMI-70 | | | | | | | 15 | 5 |
| prepolymer | prepolymer of A1 and BMI-70 | A4 | | | | | | | | 30 |
| | prepolymer of A2 and BMI-70 | A5 | | | | | | | | |
| | prepolymer of A3 and BMI-70 | A6 | | | | | | | | |
| | prepolymer of DABPA and BMI-70 | A7 | | | | | | | | |
| polyphenylene oxide resin | methacrylate-terminated polyphenylene oxide | SA-9000 | 50 | 50 | 50 | 50 | 50 | 50 | 50 | 50 |
| polyolefin | styrene-butadiene-divinyl benzene terpolymer | Ricon 257 | 10 | 10 | 10 | 10 | 10 | 10 | 10 | 10 |
| | butadiene-styrene copolymer | Ricon 100 | 10 | 10 | 10 | 10 | 10 | 10 | 10 | 10 |
| flame retardant | decabromodiphenyl ethane | 8010 | 25 | 25 | 25 | 25 | 25 | 25 | 25 | 25 |
| inorganic filler | fused silica | 568 | 50 | 50 | 50 | 50 | 50 | 50 | 50 | 50 |
| curing initiator | peroxide | 25B | 1 | 1 | 1 | 1 | 1 | 1 | 1 | 1 |
| solvent | toluene | toluene | PA | PA | PA | PA | PA | PA | PA | PA |

TABLE 2

Resin compositions of Examples (in part by weight; PA represents proper amount)

| | Component | | E9 | E10 | E11 | E12 | E13 | E14 | E15 | E16 |
|---|---|---|---|---|---|---|---|---|---|---|
| crosslinking agent | vinylbenzyl-terminated DABPA | A1 | | | | | | | | |
| | allyl-terminated DABPA | A2 | | | | | | | | |
| | methacrylate-terminated DABPA | A3 | | | | | | | | |
| | DABPA | DABPA | | | | | | | | |
| | triallyl isocyanurate | TAIC | | | | | | | | |
| | divinylbenzene | DVB-810 | | | | | | | | |
| | bismaleimide | BMI-70 | | | | | | | | |
| prepolymer | prepolymer of A1 and BMI-70 | A4 | 5 | 10 | 15 | 40 | | | 30 | 15 |
| | prepolymer of A2 and BMI-70 | A5 | | | | | 15 | | | |
| | prepolymer of A3 and BMI-70 | A6 | | | | | | 15 | | |
| | prepolymer of DABPA and BMI-70 | A7 | | | | | | | | |
| polyphenylene oxide resin | methacrylate-terminated polyphenylene oxide | SA-9000 | 50 | 50 | 50 | 50 | 50 | 50 | 35 | 80 |
| polyolefin | styrene-butadiene-divinyl benzene terpolymer | Ricon 257 | 10 | 10 | 10 | 10 | 10 | 10 | 5 | 10 |
| | butadiene-styrene copolymer | Ricon 100 | 10 | 10 | 10 | 10 | 10 | 10 | 10 | 10 |
| flame retardant | decabromodiphenyl ethane | 8010 | 25 | 25 | 25 | 25 | 25 | 25 | 25 | 25 |
| inorganic filler | fused silica | 568 | 50 | 50 | 50 | 50 | 50 | 50 | 50 | 50 |
| curing initiator | peroxide | 25B | 1 | 1 | 1 | 1 | 1 | 1 | 1 | 1 |
| solvent | toluene | toluene | PA | PA | PA | PA | PA | PA | PA | PA |

TABLE 3

Test results of resin compositions of Examples

| Item | Condition | Unit | E1 | E2 | E3 | E4 | E5 | E6 | E7 | E8 |
|---|---|---|---|---|---|---|---|---|---|---|
| volatile content of prepreg | 163° C., 15 minutes | % | 0.7 | 0.5 | 1.0 | 0.6 | 0.8 | 0.8 | 0.7 | 0.6 |
| stickiness of prepreg | 35° C., 48 hours | NA | OK | OK | OK | OK | OK | OK | OK | OK |
| resin filling property of prepreg | instrument observation | % | 100 | 100 | 100 | 100 | 90 | 50 | 60 | 100 |
| Tg | DMA, 35-270° C., 2° C./min | ° C. | 210 | 203 | 215 | 208 | 216 | 223 | 216 | 228 |
| rate of dimensional change | TMA, 50-260° C. | % | 2.7 | 2.8 | 2.6 | 2.7 | 2.6 | 2.3 | 2.5 | 2.2 |
| T288 thermal resistance | TMA, 288° C. | minutes | >60 | >60 | >60 | >60 | >60 | Δ | Δ | >60 |
| PCT | 2 atm/5 hours, 3 sheets tested | NA | ○○○ | ○○○ | ○○○ | ○○○ | ○○○ | XXX | ○XX | ○○○ |
| Dk | 2116 fabric, 55% R/C, 10 GHz | NA | 3.7 | 3.7 | 3.8 | 3.7 | 3.8 | 3.8 | 3.8 | 3.7 |
| Df | 2116 fabric, 55% R/C, 10 GHz | NA | 0.0056 | 0.0055 | 0.0058 | 0.0055 | 0.0060 | 0.0062 | 0.0059 | 0.0058 |

TABLE 4

Test results of resin compositions of Examples

| Item | Condition | Unit | E9 | E10 | E11 | E12 | E13 | E14 | E15 | E16 |
|---|---|---|---|---|---|---|---|---|---|---|
| volatile content of prepreg | 163° C., 15 minutes | % | 0.9 | 0.9 | 0.7 | 0.7 | 0.7 | 0.7 | 0.8 | 0.6 |
| stickiness of prepreg | 35° C., 48 hours | NA | OK | OK | OK | OK | OK | OK | OK | OK |
| resin filling property of prepreg | instrument observation | % | 90 | 100 | 100 | 90 | 100 | 100 | 90 | 90 |
| Tg | DMA, 35-270° C., 2° C./min | ° C. | 203 | 220 | 224 | 232 | 221 | 224 | 225 | 221 |
| rate of dimensional change | TMA, 50-260° C. | % | 2.7 | 2.4 | 2.3 | 2.2 | 2.4 | 2.3 | 2.5 | 2.4 |
| T288 thermal resistance | TMA, 288° C. | minutes | >60 | >60 | >60 | >60 | >60 | >60 | >60 | >60 |
| PCT | 2 atm/5 hours, 3 sheets tested | NA | ○○○ | ○○○ | ○○○ | ○○○ | ○○○ | ○○○ | ○○○ | ○○○ |
| Dk | 2116 fabric, 55% R/C, 10 GHz | NA | 3.7 | 3.7 | 3.7 | 3.8 | 3.7 | 3.8 | 3.7 | 3.8 |
| Df | 2116 fabric, 55% R/C, 10 GHz | NA | 0.0056 | 0.0056 | 0.0056 | 0.0065 | 0.0057 | 0.0060 | 0.0055 | 0.0058 |

TABLE 5

Resin compositions of Examples and Comparative Examples (in part by weight; PA represents proper amount)

| | Component | | C1 | C2 | C3 | C4 | C5 | C6 | C7 | E17 | E18 |
|---|---|---|---|---|---|---|---|---|---|---|---|
| crosslinking agent | vinylbenzyl-terminated DABPA | A1 | | | | | | | | 3 | 30 |
| | allyl-terminated DABPA | A2 | | | | | | | | | |
| | methacrylate-terminated DABPA | A3 | | | | | | | | | |
| | DABPA | DABPA | 15 | 15 | | | | | | | |
| | triallyl isocyanurate | TAIC | | | 15 | | | | | | |
| | divinylbenzene | DVB-810 | | | | 15 | | | | | |
| | bismaleimide | BMI-70 | | | | | 15 | | 15 | | |

TABLE 5-continued

Resin compositions of Examples and Comparative Examples (in part by weight; PA represents proper amount)

| | Component | | C1 | C2 | C3 | C4 | C5 | C6 | C7 | E17 | E18 |
|---|---|---|---|---|---|---|---|---|---|---|---|
| prepolymer | prepolymer of A1 and BMI-70 | A4 | | | | | | | | | |
| | prepolymer of A2 and BMI-70 | A5 | | | | | | | | | |
| | prepolymer of A3 and BMI-70 | A6 | | | | | | | | | |
| | prepolymer of DABPA and BMI-70 | A7 | | | | | 30 | | | | |
| polyphenylene oxide resin | methacrylate-terminated polyphenylene oxide | SA-9000 | 50 | 50 | 50 | 50 | 50 | 50 | 50 | 50 | 50 |
| polyolefin | styrene-butadiene-divinyl benzene terpolymer | Ricon 257 | 10 | 10 | 10 | 10 | 10 | 10 | 10 | 10 | 10 |
| | butadiene-styrene copolymer | Ricon 100 | 10 | 10 | 10 | 10 | 10 | 10 | 10 | 10 | 10 |
| flame retardant | decabromodiphenyl ethane | 8010 | 25 | 25 | 25 | 25 | 25 | 25 | 25 | 25 | 25 |
| inorganic filler | fused silica | 568 | 50 | 50 | 50 | 50 | 50 | 50 | 50 | 50 | 50 |
| curing initiator | peroxide | 25B | 1 | 1 | 1 | 1 | 1 | 1 | 1 | 1 | 1 |
| solvent | toluene | toluene | PA | PA | PA | PA | PA | PA | PA | PA | PA |

TABLE 6

Test results of resin compositions of Examples and Comparative Examples

| Item | Condition | Unit | C1 | C2 | C3 | C4 | C5 | C6 | C7 | E17 | E18 |
|---|---|---|---|---|---|---|---|---|---|---|---|
| volatile content of prepreg | 163° C., 15 minutes | % | 1.5 | 0.6 | 0.8 | 0.7 | 3.5 | 3.6 | 1.0 | 0.7 | 1.0 |
| stickiness of prepreg | 35° C., 48 hours | NA | OK | NG | NG | OK | NG | NG | OK | OK | OK |
| resin filling property of prepreg | instrument observation | % | 40 | 90 | 90 | 90 | 90 | 30 | 20 | 60 | 90 |
| Tg | DMA, 35-270° C., 2° C./min | ° C. | 193 | 189 | 205 | 210 | 196 | 205 | 225 | 200 | 217 |
| rate of dimensional change | TMA, 50-260° C. | % | 3.5 | 3.6 | 2.7 | 2.8 | 3.4 | 2.7 | 2.3 | 3.1 | 2.5 |
| T288 thermal resistance | TMA, 288° C. | minutes | Δ | Δ | Δ | >60 | Δ | Δ | Δ | >60 | Δ |
| PCT | 2 atm/5 hours, 3 sheets tested | NA | XXX | XXX | XXX | ○○X | ○XX | ○○X | XXX | ○○X | ○XX |
| Dk | 2116 fabric, 55% R/C, 10 GHz | NA | 3.7 | 4.1 | 4.0 | 4.0 | 3.8 | 3.7 | 3.9 | 3.7 | 3.8 |
| Df | 2116 fabric, 55% R/C, 10 GHz | NA | 0.0056 | 0.0075 | 0.0072 | 0.0070 | 0.0058 | 0.0056 | 0.0066 | 0.0057 | 0.0060 |

For the property tests listed in Table 1 to Table 6, samples (specimens) were prepared as described below and tested under specified conditions below.

Prepreg: Resin composition from each Example and each Comparative Example was separately well-mixed to form a varnish, which was then loaded to an impregnation tank; a fiberglass fabric (e.g., 2116 E-glass fiber fabric, available from Asahi) was impregnated into the impregnation tank to adhere the resin composition onto the fiberglass fabric, followed by heating and baking at 145° C. for 4 minutes to obtain a prepreg, in which most solvent has volatilized.

Copper-clad laminate (5-ply, formed by lamination of five prepregs): Two 18 μm HVLP (Hyper Very Low Profile) copper foils and five prepregs obtained from 2116 fiberglass fabrics impregnated with each Example or Comparative Example and having a resin content of about 55% were prepared and stacked in the order of one HVLP copper foil, five prepregs and one HVLP copper foil, followed by lamination under vacuum at 30 kgf/cm² pressure and 200° C. for 2 hours to form a copper-clad laminate. Insulation layers between the two copper foils were formed by laminating five sheets of prepreg, and the resin content of the insulation layers is about 55%.

3. Copper-free laminate (5-ply, formed by lamination of five prepregs): Each aforesaid copper-clad laminate was etched to remove the two copper foils to obtain a copper-free laminate (5-ply), which was formed by laminating five sheets of prepreg and has a resin content of about 55%.

Each specimen was analyzed as described below.

Volatile Content of Prepreg

Three prepregs obtained from 2116 E-glass fiber fabrics impregnated with each Example or Comparative Example were prepared and cut into a size of 4*4 square inch by reference to IPC-TM-650 2.3.19 and placed into an oven set at 163° C. for baking for 15 minutes, and the weight loss percentage before and after baking was recorded.

Stickiness of Prepreg

Four prepregs obtained from 2116 glass fiber fabrics impregnated with each Example or Comparative Example were prepared, vacuum-packed by aluminium foil bag and placed at 35° C. for 48 hours, and then the prepregs were removed for inspection of whether surface stickiness occurs between prepregs.

Resin Filling Property of Prepreg

Eleven prepregs obtained from 2116 E-glass fiber fabrics impregnated with each Example or Comparative Example were prepared and covered on both sides with a one-ounce HTE (high temperature elongation) copper foil and laminated to form a copper-clad laminate, which was drilled to form a core with through holes. A piece of prepreg obtained from 2116 E-glass fiber fabric and a piece of one-ounce HTE copper foil were stacked below it, and a release film is stacked on it, followed by another lamination to form a second copper-clad laminate. The release film on the copper-clad laminate was removed to observe whether the through holes were filled, and the filling percentage was recorded.

Glass Transition Temperature (Tg)

The copper-free laminate (obtained by laminating five prepregs) specimen was subject to glass transition temperature measurement. A dynamic mechanical analyzer (DMA) was used by reference to IPC-TM-650 2.4.24.4 "Glass Transition and Modulus of Materials Used in High Density Interconnection (HDI) and Microvias-DMA Method" to measure the glass transition temperature (° C.) of each specimen.

Rate of Dimensional Change, Z-Axis

The copper-free laminate (obtained by laminating five prepregs) specimen was subject to thermal mechanical analysis (TMA) during rate of dimensional change measurement. Each specimen was heated from 50° C. to 260° C. at an increase rate of 10° C./minute and then subject to the measurement of dimensional change (%) in Z-axis by reference to the method described in IPC-TM-650 2.4.24.5, wherein lower dimensional change (%) is more preferred and a value of greater than or equal to 0.1% represents significant difference.

T288 Thermal Resistance

The copper-containing laminate (obtained by laminating five prepregs) specimen was used in the T288 thermal resistance test. At a constant temperature of 288° C., a thermomechanical analyzer (TMA) was used by reference to IPC-TM-650 2.4.24.1 "Time to Delamination (TMA Method)" to measure each specimen and record the time to delamination. Δ represents delamination.

Thermal Resistance after Moisture Absorption (Pressure Cooking Test)

The copper-free laminate specimen with copper foil etched and removed (obtained by laminating five prepregs) was subject to the pressure cooking test (PCT) by reference to IPC-TM-650 2.6.16.1 and 5 hours of moisture absorption, and then by reference to IPC-TM-650 2.4.23, the copper-free laminate specimen after moisture absorption was immersed into a 288° C. solder bath for 20 seconds, removed and inspected for the presence of delamination or blistering, which represents fail (X), such as whether interlayer delamination or blistering occurs between insulation layers. The absence of delamination and blistering, which represents pass (O), means no interlayer delamination and blistering occurs between insulation layers. Three samples were tested for each Example or Comparative Example.

Dielectric Constant (Dk) and Dissipation Factor (Df)

In dielectric constant and dissipation factor measurements, the copper-free laminate (obtained by laminating two prepregs) was tested by using a microwave dielectrometer available from AET Corp. by reference to JIS C2565 "Measuring methods for ferrite cores for microwave device" at 10 GHz for analyzing each specimen. Lower dielectric constant and lower dissipation factor represent better dielectric properties of the specimen. A difference in Dk of greater than or equal to 0.1 represents a significant difference in dielectric constant of different laminates. A difference in Df of greater than or equal to 0.0005 represents a significant difference in dissipation factor of different laminates.

The following observations can be made from Table 1 to Table 6.

First, a resin composition of using vinylbenzyl-terminated diallyl bisphenol A as the crosslinking agent (Example E1), in contrast to those of using diallyl bisphenol A (Comparative Example C2), using other crosslinking agent such as triallyl isocyanurate (Comparative Example C5) or using divinylbenzene (Comparative Example C6), demonstrates lower volatile content of prepreg, lower stickiness of prepreg, higher glass transition temperature, lower dimensional change of laminate, better T288 thermal resistance, and better thermal resistance after moisture absorption of laminate.

A comparison of Example E1, a resin composition of using vinylbenzyl-terminated diallyl bisphenol A as the crosslinking agent and incorporating maleimide resin (Example E6) and a resin composition of using diallyl bisphenol A and the same maleimide resin (Comparative Example C3) shows that the incorporation of maleimide resin in the resin composition may enhance the glass transition temperature of laminate but at the same time lower the T288 thermal resistance and thermal resistance after moisture absorption.

Surprisingly and unexpectedly, the present inventors have found that, if a prepolymer obtained from pre-polymerization of modified (e.g., vinylbenzyl-terminated) diallyl bisphenol A crosslinking agent and an unsaturated bond-containing resin (e.g., maleimide resin) is used as the crosslinking agent, such as in the resin composition of Examples E8 to E16, in contrast to Comparative Example C4 which uses the prepolymer of diallyl bisphenol A and maleimide resin as the crosslinking agent, Examples E8 to E16 demonstrate higher glass transition temperature of laminate and at the same time maintain better T288 thermal resistance and better thermal resistance after moisture absorption.

Generally, resin compositions disclosed herein may achieve unexpected improvement in at least one, more or all properties including volatile content of prepreg, stickiness of prepreg, resin filling property of prepreg, glass transition temperature, dimensional stability under heat (i.e., rate of dimensional change under heat), T288 thermal resistance, thermal resistance after moisture absorption, dielectric constant and dissipation factor.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising:
   5 parts by weight to 25 parts by weight of a crosslinking agent or 5 parts by weight to 40 parts by weight of a prepolymer of the crosslinking agent and 3,3'-dimethyl-5,5'-diethyl-4,4'-diphenylmethane bismaleimide; and
   50 parts by weight to 100 parts by weight of a first unsaturated bond-containing resin, wherein the crosslinking agent comprises a monomer represented by formula (I), its oligomer, its polymer or a combination thereof:

(I)

wherein X in formula (I) individually represent a double bond-containing functional group or hydrogen, and not all X are hydrogen at the same time, and
wherein the first unsaturated bond-containing resin does not include maleimide resin and the first unsaturated bond-containing resin comprises divinylbenzene, bis(vinylbenzyl) ether, 1,2-bis(vinylphenyl) ethane, triallyl isocyanurate, prepolymer of triallyl isocyanurate, triallyl cyanurate, prepolymer of triallyl cyanurate, 1,2,3-trivinyl cyclohexane, diallyl bisphenol A, styrene, acrylate, vinyl-containing polyphenylene oxide resin, polyolefin, or a combination thereof.

2. The resin composition of claim 1, wherein the double bond-containing functional group is represented by any one of formula (II) to formula (IV):

(II)

(III)

(IV)

wherein $R_1$ to $R_{13}$ each represent hydrogen, halogen, an alkyl group or a haloalkyl group, and Q is a covalent bond or a functional group with at least one carbon atom.

3. The resin composition of claim 1, wherein the crosslinking agent comprises a monomer represented by any one of formula (V) to formula (VII), its oligomer, its polymer or a combination thereof:

(V)

(VI)

(VII)

4. The resin composition of claim 1, further comprising epoxy resin, cyanate ester resin, phenolic resin, benzoxazine resin, styrene maleic anhydride resin, polyester, amine curing agent, polyamide, polyimide or a combination thereof.

5. The resin composition of claim 1, further comprising flame retardant, inorganic filler, curing accelerator, solvent, silane coupling agent, surfactant, coloring agent, toughening agent or a combination thereof.

6. The resin composition of claim 1, comprising 10 parts by weight to 30 parts by weight of the prepolymer of the crosslinking agent and 3,3'-dimethyl-5,5'-diethyl-4,4'-diphenylmethane bismaleimide, and 50 parts by weight to 100 parts by weight of the first unsaturated bond-containing resin.

7. An article made from the resin composition of claim 1, comprising a prepreg, a resin film, a resin-coated copper, a laminate or a printed circuit board.

8. The article of claim 7, having a glass transition temperature as measured using a dynamic mechanical analyzer by reference to IPC-TM-650 2.4.24.4 of greater than or equal to 200° C.

9. The article of claim 7, having a rate of dimensional change in Z-axis as measured using a thermomechanical analyzer by reference to IPC-TM-650 2.4.24.5 of less than or equal to 3.0%.

10. The article of claim 7, having a T288 thermal resistance as measured by reference to IPC-TM-650 2.4.24.1 of greater than or equal to 60 minutes.

11. The article of claim 7, having a thermal resistance after moisture absorption as measured by reference to IPC-TM-650 2.6.16.1 and IPC-TM-650 2.4.23 of greater than or equal to 5 hours.

12. The article of claim 7, having a volatile content as measured by reference to IPC-TM-650 2.3.19 of less than or equal to 1.0%.

13. The article of claim 7, having at least one of the following properties:
 a dielectric constant at 10 GHz as measured by reference to JIS C2565 of less than or equal to 3.8; and
 a dissipation factor at 10 GHz as measured by reference to JIS C2565 of less than or equal to 0.0065.

* * * * *